July 24, 1928.  
G. L. PREBLE  
1,678,021
MOLDED ARTICLE AND METHOD OF MAKING SAME
Filed March 18, 1924
Fig. 1
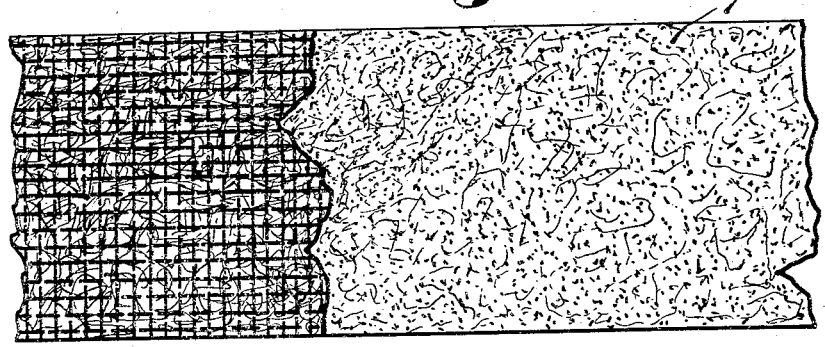
Fig. 2
Fig. 4
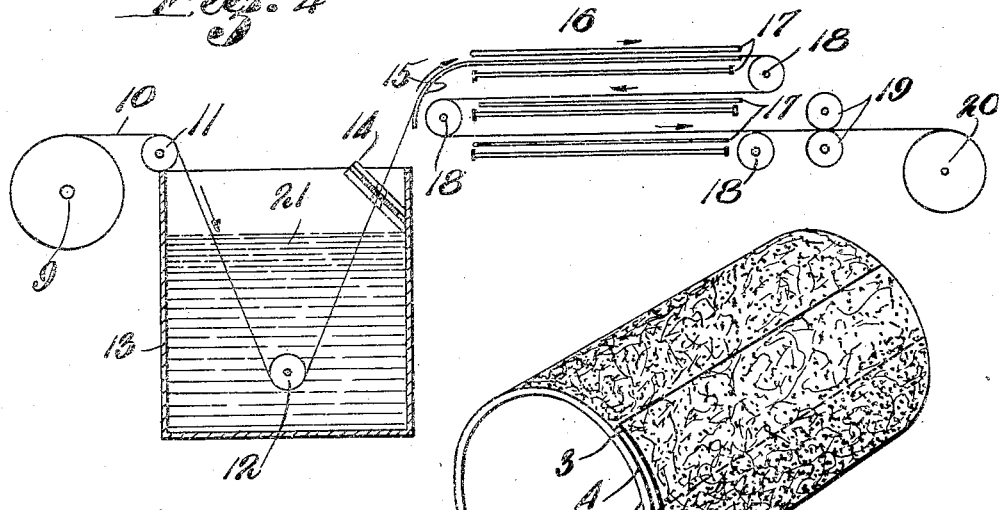
Fig. 3
Inventor
George L. Preble,
by Roberts, Roberts & Cushman
Attys.

Patented July 24, 1928.

1,678,021

UNITED STATES PATENT OFFICE.

GEORGE L. PREBLE, OF LYNN, MASSACHUSETTS, ASSIGNOR, BY DIRECT AND MESNE ASSIGNMENTS, TO PREBLE BOX TOE CO., OF LYNN, MASSACHUSETTS, A CORPORATION OF MASSACHUSETTS.

MOLDED ARTICLE AND METHOD OF MAKING SAME.

Application filed March 18, 1924. Serial No. 700,005.

This invention relates to that class of articles comprising a fibrous base, such as fabric, felt, paper or the like, treated with a composition which renders the article form-sustaining, and to a method of making same.

In the manufacture of various molded materials or articles, it is generally desirable that the operations be simple and applicable to materials which are inexpensive and readily obtained. It is also advantageous that the materials used shall be easily molded and quickly hardened and that subsequent reshaping shall be feasible. It is further important that the article, as finally produced, shall have a relatively high degree of strength, hardness and rigidity, and that it shall at the same time be somewhat resilient, waterproof and fire-resistant.

It is accordingly an object of this invention to devise a process of making molded articles which shall be amenable to these requirements, and which will result in a product having one or more of the properties enumerated.

In gereral, the method consists in preparing an impregnating fluid mixture containing a suitable compound or compounds of cellulose or its polymers partially or completely dissolved in a suitable solvent, preferably with the addition of a comminuted fluid-retaining substance or an adhesive saccharose or both, saturating a fibrous base material with said mixture, shaping the material so treated and permitting the same to harden, accompanied by evaporation of the solvent. The cellulosic compound used may be any appropriate derivative or compound of cellulose or a polymeric form of cellulose, characterized by ability to form a crystalloidal or colloidal soution in a suitable solvent and to stiffen or harden a base material saturated therewith upon subsequent evaporation of the solvent. For some purposes, where the adhesive properties of the molding composition are to be prolonged during the drying and hardening operations, it has been found advantageous to add to the impregnating fluid a saccharose or polysaccharose, such as sugar, dextrine, etc. The interaction or interrelation between such addition and the other ingredient or ingredients is not clear but it is observed that when this addition is made to the impregnating fluid a larger amount of the solvent or of the comminuted material may be added thereto without decreasing the saturation properties of the mixture and its adhesive propensities with respect to other materials which it may be desirable to incorporate with the molded article are enhanced.

The comminuted substance used may or may not be cementitious, but is of such character as to cling to the fibers of the base and to form capillary voids, adapted to induce absorption of the fluid therein and to retain a relatively large proportion of it within and upon the base material used. The saturation of the base material is accomplished in any convenient manner as by simply immersing it in the fluid, when rapid and complete impregnation of the material takes place. The superficial excess is preferably removed to provide the desired thickness and the treated material may be compressed and compacted into a thin dense sheet, or may be molded to the desired form by any convenient means with or without pressure as the character of the article or the purpose for which it is intended may determine. The shaping operation may be effected after impregnation and before hardening, as described, or the material may be allowed to harden before being shaped and subsequently softened for the shaping operation, after which the material is allowed to thoroughly dry and harden in its final form.

For purposes of illustration, the application of the method will be described as related to the preparation of plain sheets of material and to finished objects shaped therefrom.

The accompanying drawings illustrate a typical composition and structure of the product, in which:—

Fig. 1 is a top view of a sheet of the material partly broken away in section;

Fig. 2 is an enlarged cross-section of a sheet of treated fabric;

Fig. 3 is a view of a cylindrical tube molded from the composition sheet; and

Fig. 4 is a diagrammatic view of apparatus for treating and compacting the fibrous material into sheet form.

In the operation of the process, according to a typical course of procedure, an impregnating mixture is first prepared containing a compound of cellulose which has the desired properties such as strength, rigidity, etc. and a solvent thereof which is preferably volatile and of low viscosity or limpid. For example, a solution of celluloid dissolved in a commercial grade of alcohol is well suited for this purpose.

A suspension may be separately prepared, containing the comminuted substance of suitable capillary characteristics, such, for example, as plaster of Paris or powdered asbestos or both. Care should be taken to avoid the formation of lumps in the powder, but otherwise the suspension may be effected in any convenient and well-known manner. However, from the point of view of time and labor, the comminuted ingredient is preferably added directly to the solution first described in the desired quantity. The amounts used may vary, depending upon the nature of the fibrous material used and the results desired, but the mixture will usually be most effective in such proportions as to form a fluid mixture having a consistency resembling that of thick cream.

For example, a specific mixture which is found to possess the desired properties and proportions, has the following composition: 20 vols. alcohol or acetone solution of celluloid (20° Bé.), 4 vols. powdered asbestos, 2 vols. powdered plaster of Paris, 1 vol. powdered dextrine, 14 vols. alcohol, and a specific gravity of approximately 25° Baumé.

A fibrous or felted material, such as a woven fabric of animal or vegetable fibers (with or without additional fireproofing agent such as asbestos) and preferably of a somewhat open structure but in which the individual fibers are tough and flexible,—for example burlap—is then treated with the impregnating mixture. This may be done in various ways, corresponding to the particular purpose for which the ultimate product is to be used. The treatment may be limited to one side of the sheet or to predetermined areas as required. For many uses, however, the whole sheet will be treated throughout and then cut to desired sizes and shapes. This may be done readily by immersing a sheet of the material in the impregnating fluid and allowing it to become thoroughly saturated therewith, or by drawing it through the impregnating mixture in the form of a continuous strip. During this part of the process it is desirable that the impregnating fluid mixture shall be kept as nearly uniform as possible and that uneven or irregular distribution of the ingredients throughout the fabric be avoided.

When thoroughly saturated, which will ordinarily require immersion for only a few seconds, the fabric is withdrawn, partially dried, reduced to the desired thickness as by rolling, and then cut to suitable sizes and shapes, from which to make the final, individually shaped or molded objects desired. The impregnated material may, but need not necessarily, be allowed to dry or harden before proceeding with the subsequent operations.

A rectangular sheet 1, as shown in Fig. 1, may be produced by the process described. This may for example be shaped, as by rolling into a cylinder (Fig. 3) while damp, and its edges 3 overlapped and compressed, with or without the application of heat, to form a joint 4. Upon evaporation of the solvent the sheet will stiffen and harden, the overlapped portions will adhere, and a strong, tough, rigid, but slightly resilient article will result, having the size and shape into which it has been rolled or molded.

After the material has been treated, but without molding or cutting, it may be allowed to dry in the form of flat sheets. These sheets will be strong and stiff but are not fragile or brittle and may be transported and stored until required for use. They may then be cut to such sizes or shapes as may be required, dipped or thoroughly saturated with a solvent for the cellulose compound, such as alcohol, acetone, ether, etc., in the case of celluloid, or mixtures of these, and while thus softened, molded into the final shape, and allowed to dry.

The structure of the product, as finally obtained, is represented in Figs. 1 and 2, which show a side view and an enlarged cross-section respectively of a fabric, made up of woven threads 5 and fibers 5ª, impregnated with the comminuted material 6, which forms a crystalline net work of cells indicated by stippling 7, and a saturating matrix of solidified cellulosic solution (represented by cross hatching) substantially closing the pores and rendering the whole structure impervious and yet flexible.

Referring to Fig. 4, a suitable apparatus for continuously treating the sheet is shown which comprises a roll 9 carrying the fibrous material or fabric to be treated in the form of a strip 10 which passes over roller 11, downward under the roller 12 in the vat 13, thence upward between a pair of scrapers or stripping knives 14, over a curved guide 15 and into the dryer 16. Here it passes over a series of steam heated horizontal tables or plates 17, guided by rollers 18, and then between compression rollers 19 to the drum or reel 20. In operation, the impregnating fluid 21 is contained in the vat 13, which it fills to a sufficient depth to thoroughly impregnate the strip 10. The sheet is drawn through the apparatus in the direction of the arrows by revolving the drum 20 or the rollers over which it passes, or both. Upon passing through the vat 13 it will become saturated with the fluid and will also carry an excess. This excess will be removed as the strip passes between the scrapers 14 and the strip reduced to a uniform thickness. Upon passing through the drier the surplus moisture is almost entirely driven from the strip, but the sheet is sufficiently pliable, so that upon passing between compression rollers 19 the fibers are closely compacted, thereby reducing the thickness of the sheet without weakening or destroying its structure and without returning to its former thickness.

An outstanding feature of the product so obtained is the large amount of cellulosic material which is incorporated therewith both within the interstices of the fabric and upon the surfaces. Such concentration produces a stiff and strong article after it has been allowed to harden, even when thin fabrics are used or when a thick fabric is impregnated and compacted to narrow dimensions.

The saturated fabric produced in this manner possesses an appreciable degree of adhesiveness while wet, but upon drying this rapidly diminishes. By the addition of saccharose, such as sugar or dextrine, to the impregnating fluid, it is found that its adhesive properties are prolonged and that surfaces to which the sheets may be applied, or other materials incorporated with the mixture, are permanently retained thereby.

While the celluloid contained in an article made according to the process described is intrinsically flammable, the finished article itself will be found to be appreciably less inflammable regardless of the combustible or non-combustible condition of the fibrous material used, and so far as ignition is concerned may be subjected to relatively high temperatures with impunity. The structure formed by the comminuted substance protects the celluloid in this regard and also imparts strength and rigidity to the whole. When using comminuted asbestos as the absorptive material the resulting product is somewhat smoother and tougher due presumably to the fibrous character of the asbestos. But the resiliency of the celluloid is manifest in the finished product and when softened by the solvent permits substantial modification of its shape.

In some instances, where neither flammability nor the other properties incidental to the addition of the comminuted substance are required and where the adhesive properties of the saccharose is unnecessary, impregnation may be effected with the cellulosic solution alone. Other variations and modifications of the invention may, and ordinarily will be made in practice to adapt it to the numerous purposes for which it is clearly appropriate, and to modify or control the relative degree of the several effects upon the finished product which may under given circumstances be required, but such variations are within the invention and to be regarded as contemplated by the following claims.

I claim:

1. The method of making material for molded articles which comprises incorporating in fibrous material a cellulosic solution and comminuted absorptive substance, partially drying the material, compacting the material in sheet form, and then drying the material.

2. The method of making molded articles which comprises treating fibrous material with plaster of Paris, impregnating with a solution of a cellulose compound, and drying.

3. The method of making molded articles which comprises treating fibrous material with plaster of Paris, impregnating with a solution of a cellulose ester, and drying.

4. Material for making molded articles comprising a fibrous sheet, plaster of Paris interspersed among the fibers thereof, and a matrix of cellulosic compound in the interstices between said fibers and plaster of Paris.

5. Material for making molded articles comprising a fabric sheet, hydrated plaster of Paris interspersed among the fibers thereof, and a matrix of a cellulose ester in the interstices between said fibers and hydrated plaster of Paris.

Signed by me at Boston, Massachusetts, this 5th day of March, 1924.

GEORGE L. PREBLE.